United States Patent
Watt

(10) Patent No.: US 11,099,828 B2
(45) Date of Patent: Aug. 24, 2021

(54) UPDATING A METADATA STRUCTURE FOR A FIRMWARE UPDATE

(71) Applicant: Microsoft Technology Licensing, LLC, Redmond, WA (US)

(72) Inventor: Brennan Alexander Watt, San Clemente, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 120 days.

(21) Appl. No.: 16/660,547

(22) Filed: Oct. 22, 2019

(65) Prior Publication Data

US 2021/0117176 A1    Apr. 22, 2021

(51) Int. Cl.
| | |
|---|---|
| *G06F 9/44* | (2018.01) |
| *G06F 8/65* | (2018.01) |
| *G06F 8/71* | (2018.01) |
| *G06F 8/41* | (2018.01) |
| *G06F 3/06* | (2006.01) |
| *F24F 11/62* | (2018.01) |
| *G06F 9/445* | (2018.01) |

(52) U.S. Cl.
CPC .............. *G06F 8/65* (2013.01); *G06F 3/0607* (2013.01); *G06F 3/0647* (2013.01); *G06F 8/41* (2013.01); *G06F 8/71* (2013.01); *F24F 11/62* (2018.01); *G06F 9/44526* (2013.01)

(58) Field of Classification Search
CPC ..... G06F 8/65; G06F 8/71; G06F 8/41; G06F 3/0607; G06F 3/0647; G06F 9/44526; F24F 11/62
See application file for complete search history.

(56) References Cited

U.S. PATENT DOCUMENTS

| | | | |
|---|---|---|---|
| 7,484,059 B1* | 1/2009 | Ofer ...................... | G06F 3/0607 711/162 |
| 10,146,515 B1* | 12/2018 | Sundresh .................. | G06F 8/41 |
| 10,552,085 B1* | 2/2020 | Chen ...................... | G06F 3/0647 |
| 2007/0294385 A1* | 12/2007 | Kapadekar ................ | G06F 8/65 709/223 |
| 2014/0007069 A1 | 1/2014 | Cavalaris et al. | |
| 2016/0202964 A1* | 7/2016 | Butcher ................... | G06F 8/65 717/172 |
| 2017/0003956 A1 | 1/2017 | Chang | |
| 2017/0212487 A1* | 7/2017 | Gupta ..................... | F24F 11/62 |
| 2020/0026505 A1* | 1/2020 | Olderdissen ........ | G06F 9/44526 |

OTHER PUBLICATIONS

"International Search Report and Written Opinion Issued in PCT Application No. PCT/US20/055643", dated Jan. 29, 2021, 13 Pages.

* cited by examiner

*Primary Examiner* — Tuan A Vu
(74) *Attorney, Agent, or Firm* — Ray Quinney & Nebeker P.C; James Bullough

(57) ABSTRACT

The present disclosure relates to a method for updating a metadata structure to be compatible with an update between the first version of firmware and a second version of firmware, including formation of migration data (e.g., migration arrays) associated with corresponding blocks of metadata for different versions of firmware, and comparing of attributes of the migration data to determine various migration actions to perform in generating an updated metadata structure that is compatible with an update between versions of firmware.

20 Claims, 8 Drawing Sheets

UPDATING A METADATA STRUCTURE FOR A FIRMWARE UPDATE

BACKGROUND

Recent years have seen a precipitous rise in the use of computing devices (e.g., mobile devices, personal computers, server devices, cloud computing systems, internet of things (IoT) devices) to perform a variety of functions. Many devices use a variety of hardware and software to perform a variety of tasks, which are often unique to specific types of devices. Indeed, a wide variety of electronic devices rely on firmware and associated data structures (e.g., metadata files) to reliably perform a variety of specific functions.

Many computing devices rely on firmware updates. For example, firmware updates may be performed to add additional features, further enhance existing capabilities of devices, provide reliable performance, and fix various issues that may arise over time. When performing firmware updates, it is important that devices continue to operate reliably and as designed. However, as devices and firmware have developed and increased in complexity, a number of problems and drawbacks are often introduced in the course of performing one or more firmware updates.

For example, conventional systems for updating firmware are often ill-equipped to update between two non-subsequent versions of firmware. For instance, where firmware of a device has not been updated for a while, updating to a most current version of firmware may involve skipping one or more intermediate versions of the firmware. Because mechanisms for updating firmware often fail to account for differences between non-subsequent versions of the firmware, skipping multiple versions may introduce a number of incompatibility issues and cause a device to not operate correctly.

Along similar lines, many systems for updating firmware are often unable to downgrade from a more current version to a less current version. As a result, where a more current version may have fundamental flaws or introduce a number of bugs, individuals often find themselves unable to revert to a previous version of firmware. Indeed, many systems for updating firmware have a firm policy to simply block downgrades of firmware, which may result in significant problems where a current version of firmware introduces a number of flaws. In addition, simply reinitiating installation of a previous version of firmware and associated metadata structure(s) is often a computationally expensive and time-consuming process that results in interruption of service by one or more devices.

These and other problems exist with regard to updating firmware on a computing device.

DETAILED DESCRIPTION

Figure 1:
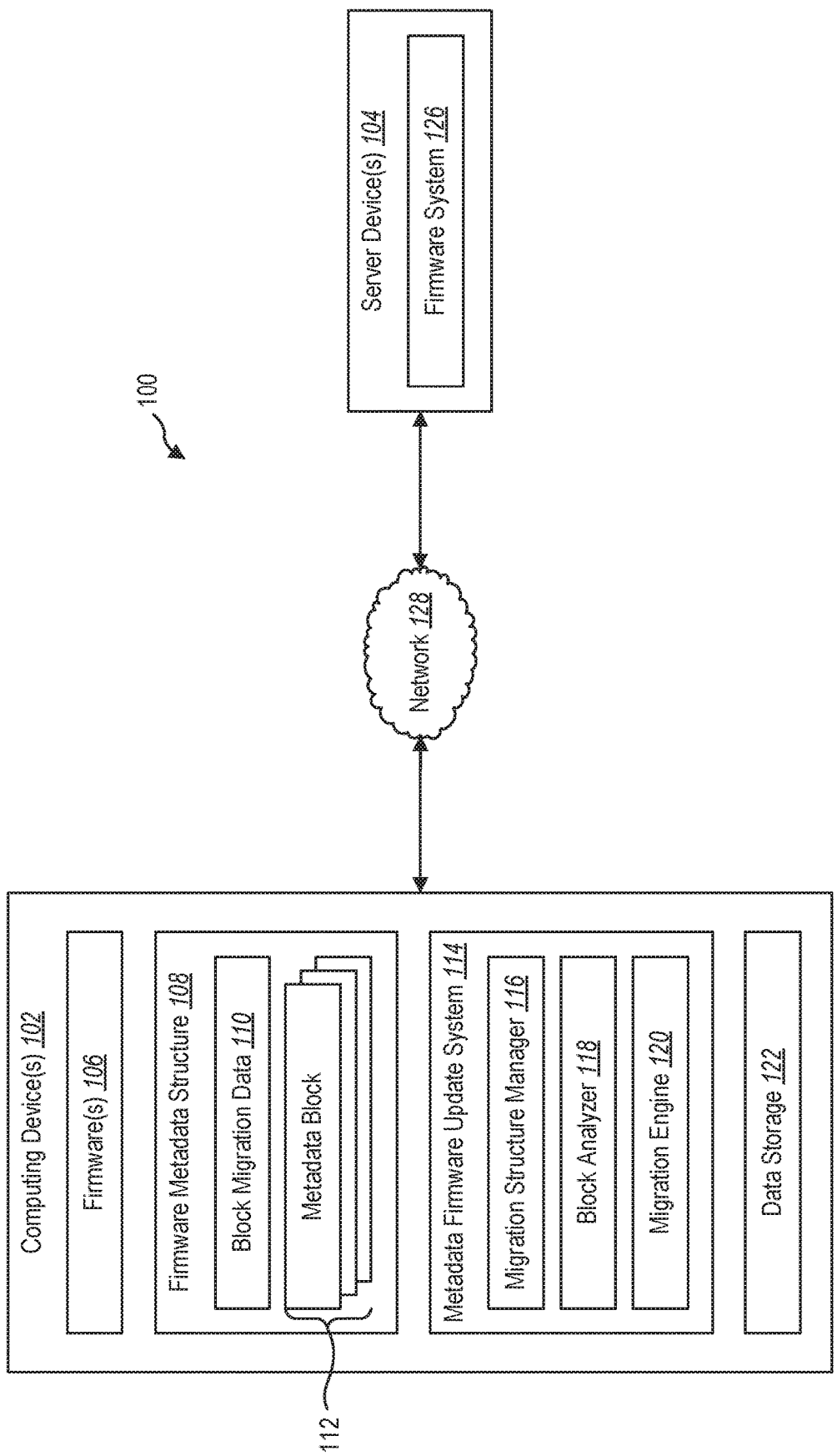
FIG. 1 illustrates an example environment including a firmware update system in accordance with one or more embodiments.

The present disclosure relates generally to a metadata firmware update system (or simply "firmware update system") for updating a metadata structure associated with a first version of firmware to be compatible with an update between the first version of firmware and a second version of firmware. In particular, as will be discussed in further detail below, the firmware update system can generate one or more migration structures for respective portions (e.g., metadata blocks) of a metadata structure that includes metadata corresponding to functional elements of an associated version of firmware. The attributes may include indicators or descriptors of respective portions of the metadata structure. The firmware update system can generate migration structures (e.g., arrays) associated with multiple versions of firmware and compare attributes associated with the different versions of firmware to facilitate an update of the metadata structure (or generation of a new metadata structure) to be compatible with an updated version of the firmware on a computing device.

More specifically, and as will be discussed in further detail below, the firmware update system can initiate an upgrade from a first version of firmware to a second version of the firmware. Prior to or in response to initiating the firmware update, the firmware update system can generate a migration structure including a first plurality of migration arrays having a first set of attributes for metadata blocks from a metadata structure. The firmware update system can further generate a second migration structure including a plurality of migration arrays having a second set of attributes for a second plurality of metadata blocks for an updated metadata structure. Based on a comparison of the migration structures associated with the respective versions of the firmware, the firmware update system can generate an updated metadata structure that complies with or is otherwise compatible with the second version (e.g., the updated version) of the firmware.

As will be discussed in further detail below, the present disclosure includes a number of practical applications having features and functionality described herein that provide benefits and/or solve problems associated with updating firmware, and specifically updating a metadata structure associated with firmware in such a way to ensure compatibility of metadata with an updated version of the firmware. It will be understood that the below-described benefits are provided by way of example, and other benefits and/or solutions to various problems with implementing an update of firmware and associated metadata structures may similarly be accomplished using features and functionalities described herein.

For example, the firmware update system can significantly reduce processing expense by iteratively evaluating migration arrays for corresponding metadata blocks and performing migration actions only where needed. In particular, because firmware version upgrades often involve migrating a significant number or percentage of metadata blocks as they exist in the previous version of firmware, comparing attributes on a per-block basis enables the firmware update system to avoid re-initializing or rewriting a significant number of the metadata blocks when generating the updated metadata structure. Indeed, by iterating through each of the metadata blocks in accordance with one or more embodiments described herein, the firmware update system can limit performing more invasive migration actions on those metadata blocks that involve minor or major iteration changes between different versions of the firmware.

In addition to reducing processing expense, the firmware update system can reduce or eliminate potential delays caused as a result of re-initializing an entire metadata structure and/or otherwise generating a new metadata structure from scratch. Indeed, as metadata structures associated with firmware become more complex, conventional systems often take longer and longer to perform firmware upgrades and generate updated metadata structures. By iterating through the blocks and comparing corresponding attributes of migration structures, the firmware update system can leverage attributes of previous versions of firmware to significantly reduce an amount of time and processing resources needed to carry out a firmware update.

As will be discussed in further detail below, the firmware update system may additionally implement a firmware neutral model that achieves both forward and backward compatibility between versions of firmware. In particular, by identifying types of changes between blocks of metadata between different (e.g., previous and next) versions of firmware, the firmware update system can consider an inclusive set of migration actions that enables migration of metadata between versions of firmware under the vast majority of possible scenarios. Indeed, as will be discussed below, the firmware update system may implement an algorithm to identify and carry out an appropriate migration action where a major or minor revision increases (e.g., when performing a forward upgrade) as well as when a major or minor revision decreases (e.g., when performing a backward update). Moreover, even where migrating fields of metadata between versions would result in incompatibility with an updated version of firmware, the firmware update system may nonetheless perform a hard reset for the corresponding block of metadata without necessarily requiring that the entire metadata structure be reinitialized or generated from scratch.

In addition, features and functionality of the firmware update system described herein provide a scalable and flexible mechanism for updating a metadata structure that avoids downfalls caused as a result of human error. Indeed, by providing an automated process that is applicable to the vast majority of potential upgrade types, the firmware update system can provide an automated update process that avoids human error while similarly accomplishing forward, backward, and lateral compatibility, as mentioned above.

As illustrated in the foregoing discussion, the present disclosure utilizes a variety of terms to described features and advantages of the systems described herein. Additional detail is now provided regarding the meaning of some of these terms. As used herein, "firmware" refers to any data or program stored on a computer or other device that provides instructions on how a device should operate. A first version of firmware may refer to a previous version of the firmware previously on a device prior to initiating or performing a firmware update. In addition, a second version of firmware may refer to a next version of the firmware corresponding to an updated version after initiating or performing a firmware update.

As used herein, a "firmware update" refers to a process whereby a first version of firmware is updated to a second version of firmware. A firmware update may refer to an update from an older version of firmware to a newer or more current version of firmware (e.g., a forward update). Alternatively, a firmware update may refer to an update from a newer or more current version of firmware to an older version of firmware (e.g., a backward update). In one or more embodiments, a firmware update refers to a lateral update between two similar or identical versions of the firmware. A firmware update may include major updates (e.g., major revision increases or decreases), minor updates (e.g., minor revision increases or decreases), and lateral updates (e.g., where major and minor revisions match between respective firmware versions). Further information in connection with different types of updates and associated actions for implementing different types of updates will be discussed in further detail below.

As used herein, a "metadata structure" refers to a store of metadata associated with firmware or a specific version of firmware and maintained on a memory and/or storage of a computing device. As will be discussed herein, the metadata structure may include any number of metadata blocks having data associated with respective functions or features of the firmware. The metadata structure may also include any number of fields and/or definitions descriptive of the respective features and functions of the firmware. In one or more embodiments, the metadata structure refers to any or all metadata corresponding to firmware(s) stored in dynamic random-access memory (DRAM) or other memory system.

As used herein, a "metadata block" refers to any discrete portion of the metadata structure including information fields and/or definitions containing metadata associated with corresponding features and functionality of the firmware. In one or more embodiments, each metadata block includes metadata for a corresponding functional element of the firmware. By way of example, and not limitation, a metadata block may include metadata associated with instructions for monitoring overall health of a solid-state storage (SSD) drive. As another example, another metadata block may include metadata associated with instructions for managing garbage collection of a storage of a device. As a further example, a metadata block may include a data map (e.g., a flash translation layer (FTL) map) having critical metadata for the firmware. The metadata structure may include any number of metadata blocks associated with any number of respective features and functions of the firmware and/or device.

As mentioned above, the metadata structure may further include a number of migration arrays having a set of attributes for corresponding metadata blocks. As used herein, a "migration array" or "migration element" may refer to an array (or other data structure) of values that identify attributes of metadata blocks including, by way of example, a major revision, a minor revision, a size of the metadata block, an address of the metadata block within a DRAM or other storage, one or more bitmaps, or other identifiers of characteristics of the metadata block. While one or more embodiments described herein refer to a digital array including respective fields, the migration array may refer to any data object including accessible values. For example, a migration array may include a table of values, vector of values, or document having values for any of the attributes described herein. Moreover, and as will be discussed in further detail below, multiple migration elements may be contained within a migration structure corresponding to a respective version of firmware.

Additional detail will now be provided regarding a firmware update system for implementing an upgrade between different versions of firmware in addition to generating an updated metadata structure that is compatible with a current version (e.g., updated version) of the firmware. For example, FIG. 1 illustrates an example environment 100 including a computing device 102 and a server device 104. As shown in FIG. 1, the computing device 102 includes firmware(s) 106 having any number of instructions to implement core functionalities of the computing device 102. The firmware(s) 106 may include a current version of firmware 106. In addition, the firmware(s) 106 may include one or more previous versions of firmware (e.g., prior to upgrading to the current version of the firmware 106). In one or more implementations, the firmware(s) 106 includes a next version of firmware (e.g., prior to completing a migration process).

In conjunction with the firmware(s) 106, the computing device 102 may additionally include a firmware metadata structure 108 (or simply "metadata structure 108") corresponding to a respective version of firmware. The metadata structure 108 may include block migration data 110 having a plurality of migration arrays for one or more previous versions of firmware as well as one or more next versions of firmware. The migration data 110 facilitates generating an updated firmware metadata structure in accordance with one or more embodiments described herein. Additional detail in connection with the block migration data 110 will be discussed in further detail herein.

As further shown, the metadata structure 108 may include a plurality of metadata blocks 112 having fields and definitions associated with corresponding features of the firmware(s) 106. As mentioned above, the metadata structure 108 may include any number of metadata blocks 112 corresponding to any number of functional features of the firmware(s) 106. By way of example, and not limitation, the metadata blocks 112 may include a first block having data associated with maintaining health of an SSD storage. The metadata blocks 112 may additionally include a second block associating with managing garbage collection or fragmentation of the SSD storage. Another metadata block may include a memory snapshot (e.g., an FTL map) or other critical metadata. Indeed, the metadata blocks 112 may include any number of blocks associated with any function of the computing device 102 and/or firmware 106.

While FIG. 1 illustrates an example in which the computing device 102 includes a metadata structure 108 corresponding to a current version of firmware 106, it will be understood that the computing device 102 may maintain a metadata structure for one or more previous versions of firmware. For example, where the firmware 106 has been updated a number of times on the computing device 102, the computing device 102 may maintain metadata (or indexes representative of the metadata) corresponding to the previous versions of the firmware 106. For instance, in one or more embodiments, the computing device 102 maintains block migration data 110 for one or more previous versions of the firmware 106 for use in potentially performing a downgrade or reverse upgrade of the firmware 106 from a current version to a less recent version.

As further shown in FIG. 1, the computing device 102 includes a metadata firmware update system 114 (or simply "firmware update system 114") to implement features and functionality described herein in connection with generating the metadata structure 108 and implementing one or more firmware updates. The firmware update system 114 may include a migration structure manager 116 for generating and/or maintaining one or more metadata structures. As will be discussed below, the migration structure manager 116 may maintain or generate block migration data 110 corresponding to any of a number of firmware versions. The migration structure manager 116 may cause migration data to be generated and/or updated passively (e.g., at any time prior to initiating an update) or in response to initiating a firmware update.

The firmware update system 114 may further include a block analyzer 118. The block analyzer 118 may evaluate block migration data 110 to determine an appropriate migration action that should be performed for a corresponding metadata block from the plurality of metadata blocks 112. For example, and as will be discussed below, the block analyzer 118 may compare block migration data 110 for a previous version of firmware to block migration data 110 for a next version of firmware (e.g., after initiating an upgrade from the previous version to the next version of the firmware).

As further shown, the firmware update system 114 may include a migration engine 120 for carrying out one or more migration actions. In particular, and as will be discussed in further detail below, the migration engine 120 may carry out one or more specific migration actions based on a type of change between corresponding metadata blocks of a previous version of firmware and a next version of firmware. In one or more embodiments, the migration engine 120 performs a migration action for each of the metadata blocks 112 as part of generating an updated metadata structure 108. Additional detail in connection with performing a variety of migration actions will be discussed in connection with FIGS. 3A-4D.

As further shown, the computing device 102 includes a data storage 122. The data storage 122 may include any data stored on the computing device 102 accessible to any of the components 106-120 discussed herein. For example, the data storage 122 may include an SSD storage having the firmware installed and/or running thereon. The data storage 122 may include version data or any other data needed to construct the metadata structure 108 and/or implement components 116-120 of the firmware update system 114.

As further shown and as mentioned above, the environment 100 includes one or more server device(s) 104 having a firmware system 126 thereon. The firmware system 126 may generate and/or provide firmware(s) 106 and any associated data to the computing device(s) 102. For example, the firmware system 126 may maintain any number of firmware versions for one or more types of computing devices and provide the firmware(s) 106 upon request from the computing device 102. In one or more embodiments, the firmware system 126 causes the server device(s) 104 to provide versions of firmware for implementing automatic firmware updates on the computing device 102.

The computing device 102 and the server device(s) 104 may communicate with each other directly or indirectly through a network 128. The network 128 may include one or multiple networks and may use one or more communication platforms or technologies suitable for transmitting data. The network 128 may refer to any data link that enables the transport of electronic data between devices and/or modules of the environment 100. The network 128 may refer to a hardwired network, a wireless network, or a combination of hardwired and wireless networks. In one or more embodiments, the network 128 includes the Internet.

The computing device may refer to various types of computing devices. For example, the computing device 102 may include a mobile device such as a mobile telephone, a smartphone, a PDA, a tablet, a laptop, or wearable computing device. In addition, the computing device 102 may include a non-mobile device such as a desktop computer, server device, or other non-portable device. The computing device 102 may further refer to a more specialized computing device such as a gaming consoles, a cloud computing node, a printer, a scanner, or other device that makes use of firmware. While FIG. 1 illustrates an example in which a single computing device includes components 106-122 therein, the computing device(s) 102 may refer to a pairing of devices that cooperatively provide firmware and associated metadata to implement core functionality of a computing device.

While FIG. 1 illustrates an example environment 100 in which a server device(s) 104 provides firmware to a computing device via a network 128, one or more embodiments described herein may refer to different arrangements or configurations of devices. For example, the computing device may refer to a server device on a cloud computing system in which the firmware system 126 provides firmware to the computing device 102 over cloud computing resources. Moreover, one or more of the components 106-126 and associated features and functionalities may be implemented across one or more devices in a different environment than explicitly shown in FIG. 1.

Each of the components 106 and 114-122 may be in communication with one another using any suitable communication technologies. Additionally, the components 106 and 114-122 on the computing device 102 may be in communication with other devices. It will be understood that while the components 106 and 114-122 of the computing device 102 shown in FIG. 1 are shown to be separate, any of the subcomponents may be combined into fewer components, such as into a single component, or divided into more components as may serve a particular embodiment.

In addition, the components 106 and 114-122 of the computing device 102 may include software, hardware, or both. For example, the components 106 and 114-122 can include one or more instructions stored on a computer-readable storage medium and be executable by processors of one or more computing devices. When executed by the one or more processors, the computer-executable instructions of the components 106 and 114-122 can cause the computing device 102 to perform the methods described herein. Alternatively, the components 106 and 114-122 can comprise hardware, such as a special-purpose processing device to perform a certain function or group of functions. Additionally, or alternatively, the components 106 and 114-122 can include a combination of computer-executable instructions and hardware.

As mentioned above, the firmware(s) 106 and firmware update system 114 may cooperatively generate and update the metadata structure 108 on a memory system (e.g., DRAM) of the computing device 102. In particular, in one or more embodiments, the firmware(s) 106 (e.g., a previous version of firmware) may generate block migration data 110 corresponding to a previous version of firmware. The firmware(s) 106 (e.g., a next version of firmware) may additionally generate block migration data 110 corresponding to a next version of firmware. The firmware update system 114 may evaluate the block migration data 110 and determine one or more migration actions to perform on the metadata blocks 112 to generate an updated metadata structure 108 that avoids failures of an updated version of firmware and guarantees compatibility between the two different versions of firmware.

Figure 2:
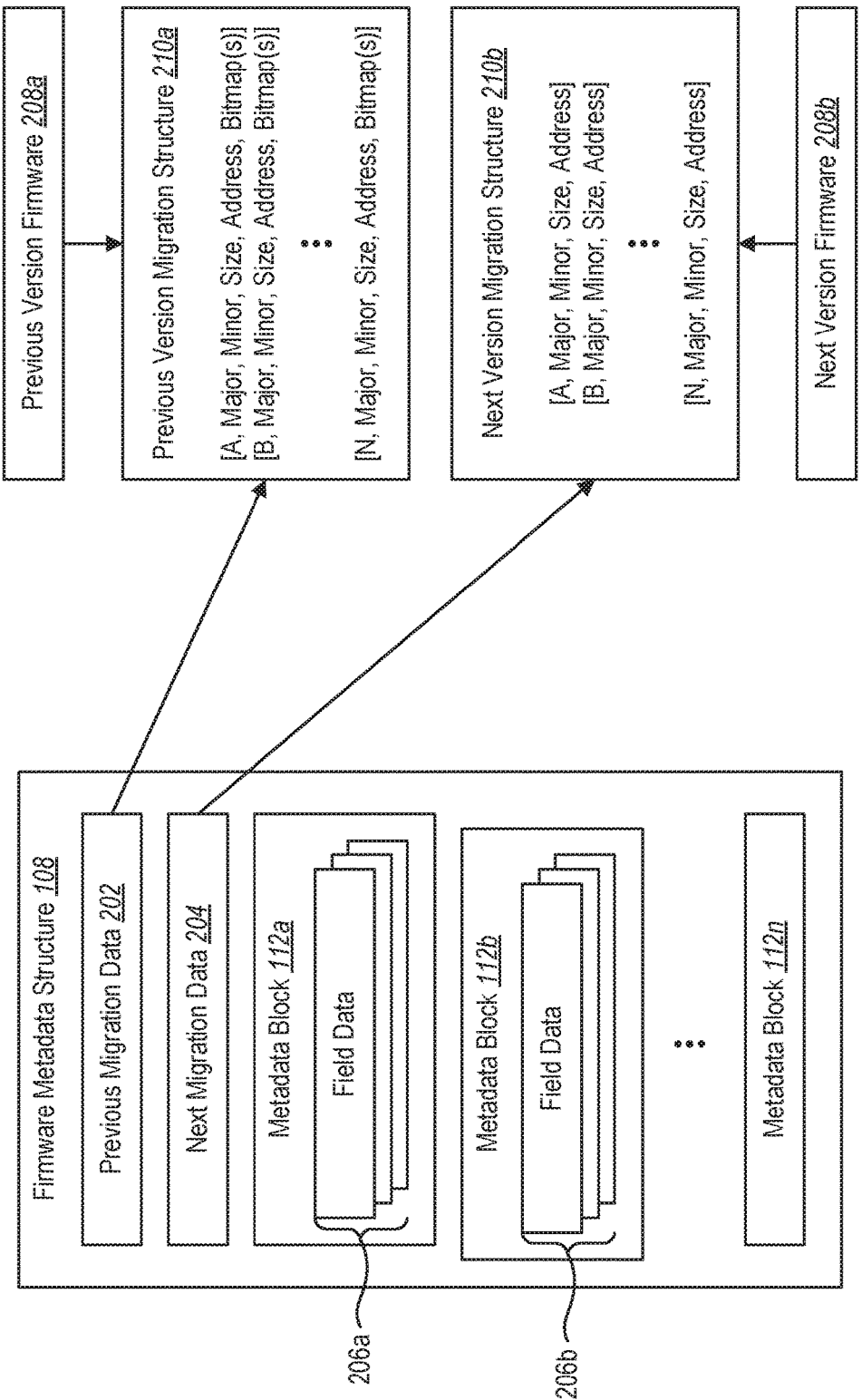
FIG. 2 illustrates an example metadata structure including metadata blocks and associated migration structures in accordance with one or more embodiments.

Additional detail will now be provided in connection with the metadata data structure 108 in connection with FIG. 2.

In particular, FIG. 2 illustrates a metadata structure 108 in accordance with one or more embodiments described herein. As shown in FIG. 2, the metadata structure 108 includes previous migration data 202. The previous migration data 202 may include migration elements (e.g., arrays) corresponding to a previous version of firmware (e.g., previous version firmware 208a). The metadata structure 108 additionally includes next migration data 204. Next migration data 204 may include migration elements (e.g., arrays) corresponding to a next version of firmware (e.g., next version firmware 208b).

The metadata structure 108 may additionally include a plurality of metadata blocks 112a-n having respective field data (e.g., instructions, definitions, critical metadata) associated with functional elements of the firmware. For example, a first metadata block 112a may include field data 206a having instructions, definitions, or other data associated with a first functionality of the computing device 102 and/or firmware. The second metadata block 112b may further include field data 206b having instructions, definitions, or other data associated with a second functionality of the computing device and/or firmware. As shown in FIG. the metadata structure 108 may include any number of metadata blocks 112a-n having data associated with corresponding features and functionality provided by a corresponding version of firmware.

As shown in FIG. 2, the metadata structure 108 includes metadata blocks 112a-n as they exist prior to carrying out an update between the previous version of firmware 208a and the next version of firmware 208b. Nonetheless, as will be discussed in further detail in connection with FIGS. 3A-4D, the metadata firmware update system 114 may generate an updated metadata structure including an updated plurality of metadata blocks and associated data corresponding to the second version of firmware 208b after performing migration actions for the plurality of metadata blocks 112a-n in accordance with one or more embodiments described herein.

As shown in FIG. 2, and as will be discussed further below, the previous migration data 202 may include a previous version migration structure 210a. The previous migration structure 210a may include a number of migration elements. For example, in one or more embodiments, the previous version firmware 208a generates a previous version migration structure 210a including migration arrays having sets of attributes associated with the metadata blocks 112a-n. As shown in FIG. 2, the previous version migration structure 210a may include a migration array having a set of attributes for each metadata block from the plurality of metadata blocks 112a-n.

More specifically, in the example shown in FIG. 2, the previous version migration structure 210a includes a first migration array having a plurality of values or identifiers associated with attributes of the first metadata block 112a. The first migration array may include an index value "A," an identified major revision, an identified minor revision, a size of the metadata block 112a, an address of the metadata block 112a (e.g., an address within a DRAM or other memory system of the computing device 102, and one or more bitmaps associated with compatibility of the metadata block 112a between the previous version firmware 208a and other versions of firmware (e.g., less recent version of firmware).

As further shown, the previous version migration structure 210a includes multiple migration arrays for each of the additional metadata blocks 112b-n of the metadata structure 108. As shown in FIG. 2, each of the migration arrays include index values, major and minor revision identifiers, sizes of corresponding metadata blocks 112b-n, addresses of metadata blocks 112b-n, and bitmaps associated with compatibility between different versions of firmware.

Also shown in FIG. 2, the next migration data 204 may include a next version migration structure 210b having a number of migration elements. For example, in one or more embodiments, the next version firmware 208b generates the next version migration structure 210b including migration arrays having attributes associated with a corresponding metadata structure (e.g., metadata blocks for the next version firmware 208b). The next version migration structure 210b may include a plurality of migration arrays having a migration array for each of a plurality of metadata blocks corresponding to the next version firmware 208b.

More specifically, the next version migration structure 210b may include migration arrays having one or more identifiers of attributes (e.g., a subset of attributes) similar to the migration arrays included within the previous version migration structure 210a. For example, a first migration array from the next version migration structure 210b may include an index field "A," an identification of a major revision and a minor revision, a size of a metadata block, and an address associated with the metadata block. As further shown, the next version migration structure 210b may include a plurality of migration arrays having similar attribute identifiers and corresponding to each of the migration arrays from the previous version migration structure 210a. In one or more embodiments, the next version migration structure 210b does not include any bitmaps associated with compatibility of the next version and other known firmware versions.

Figure 3A:
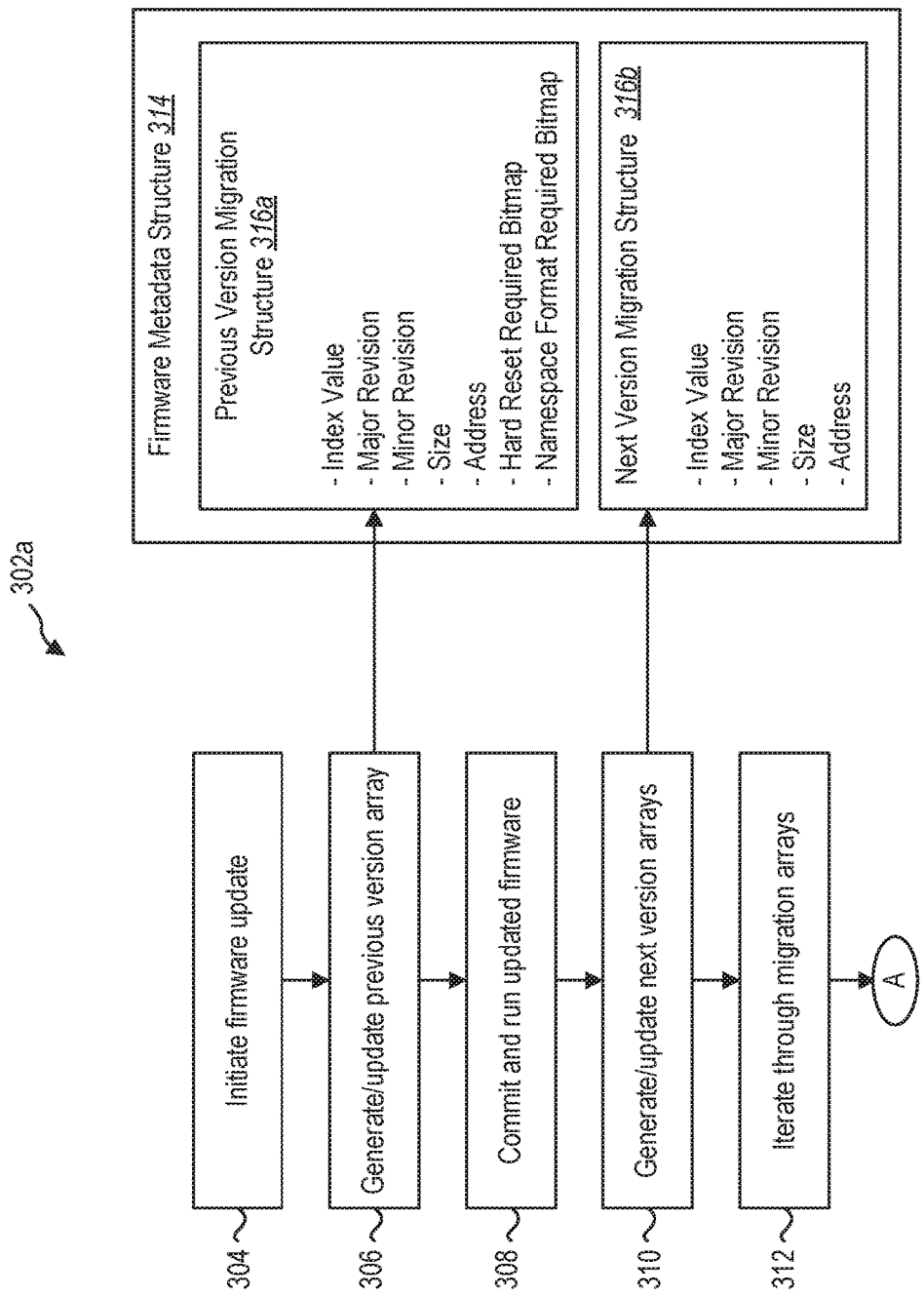
FIG. 3A illustrates a series of acts for generating migration arrays for respective versions of a firmware in accordance with one or more embodiments.

Additional information will now be provided in connection with a series of acts for implementing a firmware update in accordance with one or more embodiments described herein. For example, FIG. 3A illustrates a first series of acts 302a for generating migration structures in accordance with one or more embodiments described herein. The series of acts 302a may be performed by the metadata firmware update system 114 and/or the different versions of firmware 106 on the computing device 102.

As shown in FIG. 3A, the firmware update system 114 may perform an act 304 of initiating a firmware update. As indicated above, the firmware update system 114 may initiate an update between a first version of firmware (e.g., a previous version of firmware) and a second version of firmware (e.g., a next version of firmware). The first version of firmware may refer to an older version (e.g., a less recent or outdated version) of firmware while the second version of firmware may refer to a newer or more current version of firmware. The firmware versions may refer to subsequent versions (e.g., version 1 to version 2) or non-subsequent versions (e.g., version 1 to version 4) of firmware. In addition, the first firmware version may refer to a newer version to be updated to a less version of firmware (e.g., a reverse update). In one or more implementations, the firmware update is a lateral update between two of the same versions of firmware.

As shown in FIG. 3A, the first version of firmware may perform an act 306 of generating and/or updating previous version arrays associated with corresponding metadata blocks of the first version of firmware. In particular, the first version of firmware may generate a previous version migration structure including migration arrays for each metadata block of a metadata structure. As shown by way of example, the first version of firmware can generate a previous version migration structure 316a (e.g., a migration array) for a corresponding portion of metadata including a set of attributes descriptive of the corresponding portion of metadata.

The first version of firmware may store or otherwise maintain the previous version migration structure 316a (and other migration arrays) on a system memory 314 (e.g., DRAM) of the computing device 102.

As shown in FIG. 3A, the previous version migration structure 316a may include a set of attributes descriptive of a corresponding metadata block. Similar to the examples described above in connection with FIG. 2, the previous version migration structure 316a may include attribute identifiers. By way of example, the attribute identifiers may include an index value, a major revision (e.g., an identifier of a major revision), a minor revision (e.g., an identifier of a minor revision), a size of the metadata block, an address of the metadata block, and bitmaps associated with compatibility between versions of firmware. For example, the previous version migration structure 316a may include a hard reset required bitmap indicating whether blocks from different firmware versions can be compatible or need to be reinitialized as part of a migration action. In addition, the previous version migration structure 316a may include a namespace format required bitmap indicating that a metadata structure needs to be changed thereby indicating that updating to an indicated version of firmware would involve reformatting or implementing a layout change to physical media (e.g., NAND media).

In response to initiating the firmware update 304, the firmware update system 114 may perform an act 308 of committing and running updated firmware. For example, the firmware update system 114 may commit and run the second version of firmware prior to completing migration of metadata and generating the updated metadata structure.

As further shown, the second version of firmware may perform an act 310 of generating and/or updating next version arrays associated with corresponding blocks of metadata for the second version of firmware. In particular, the second version of firmware may generate a next version migration structure including migration arrays for each metadata block of a metadata structure corresponding to the second version of firmware. The next version migration structure 316b may be stored or otherwise maintained on the system memory 314 (e.g., DRAM) of the computing device 102. As shown by way of example, the second version of firmware can generate a next version migration structure 316b for a corresponding portion of metadata, including a set of attributes descriptive of the corresponding portion of metadata. In the example shown in FIG. 3A, the next version migration structure 316b may correspond to a similar block of metadata as the previous version migration structure 316 (e.g., the migration structures 316a-b may correspond to blocks of metadata having similar index values and/or corresponding to similar functional features of the firmware versions).

The firmware update system 114 may additionally perform an act 312 of iterating through the migration arrays. In particular, the firmware update system 114 may compare sets of attributes for each corresponding pair of migration arrays to determine an associated migration action to perform. In one or more embodiments, the firmware update system 114 iterates through each of the plurality of metadata blocks and generates an updated metadata structure by performing an appropriate migration action on the plurality metadata blocks for the first version of firmware based on a comparison between migration arrays. Additional detail in connection with comparing sets of attributes from corresponding pairs of migration arrays and performing corresponding migration actions is provided in connection with FIG. 3B.

Figure 3B:
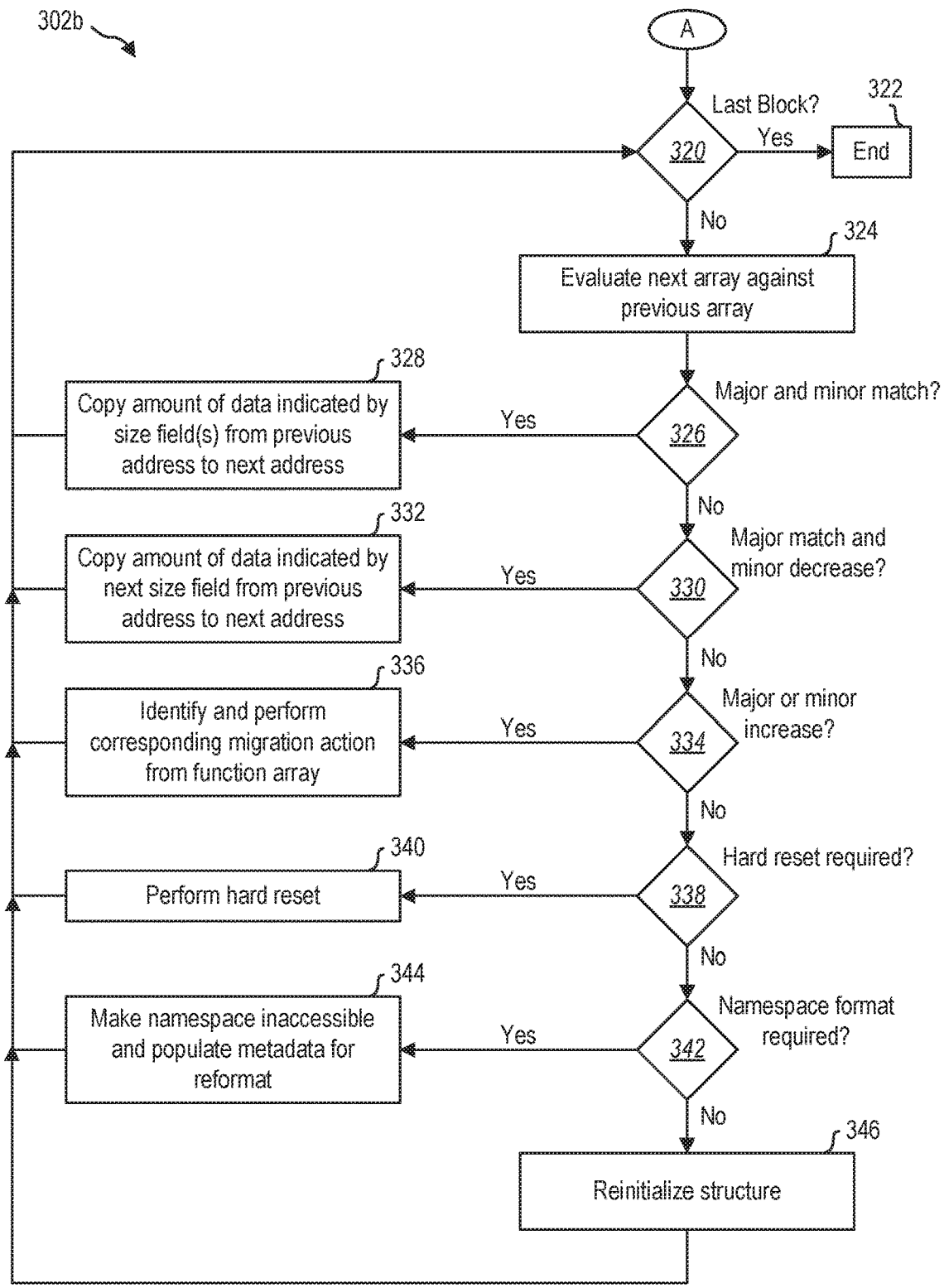
FIG. 3B illustrates a series of acts for updating a metadata structure to ensure compatibility when updating firmware in accordance with one or more embodiments.

For example, FIG. 3B illustrates a series of acts 302*b* that may be performed in conjunction with the series of acts 302*a* shown in FIG. 3A to update a metadata structure in accordance with one or more embodiments described herein. As shown in FIG. 3B, the firmware update system 114 may iterate through the plurality of metadata blocks (e.g., from the metadata structure 108 associated with the first version of the firmware) by performing an act 320 of determining whether a metadata block is a last block from a plurality of metadata blocks. In particular, the firmware update system 114 may determine whether a most recently evaluated metadata block is the last block to be evaluated and/or migrated to the updated metadata structure. Where the firmware update system 114 determines that all of the blocks/arrays have been evaluated, the firmware update system 114 may end 322 the evaluation of metadata and conclude the process of updating the metadata structure 108.

Alternatively, where an identified metadata block is not the last evaluated or migrated block of metadata, the firmware update system 114 may perform an act 324 of evaluating a next array against a previous array (e.g., a next version migration structure against a previous version migration structure). For example, the firmware update system 114 may evaluate a next pair of migration arrays corresponding to a next metadata block for a first (e.g., previous) version of firmware and a second (e.g., next) version of firmware. In one or more embodiments, the firmware update system 114 compares the attribute identifiers included within respective migration arrays associated with the current metadata block.

In one or more implementations, the firmware update system 114 compares the major and minor revision identifiers from the respective migration arrays to determine a type of change between the metadata blocks when updating from the first version to the second version of firmware. For example, the firmware update system 114 may determine whether an update involves a major change (e.g., increase or decrease), a minor change (e.g., an increase or decrease) or a match (e.g., neither an increase or decrease) between firmware versions. As will be discussed below, the firmware update system 114 may perform a variety of migration actions based on a determining of the type of change (e.g., a major change, a minor change, and/or no change between minor and major revisions).

As used herein, a minor and major change refers to a type of change between respective blocks of metadata. By way of example, a minor increase may refer to a decrease in fields between a first block and a second block where the second block may be superimposed on the first block. For instance, where a first set of fields includes fields "1, 2, and 3" and a second set of fields includes fields "1 and 2" where "1 and 2" from the second set of fields may be superimposed over the "1 and 2" of the first set of fields, this would refer to a minor decrease. As a further example, a minor increase refers to an increase in fields between a first block and a second block where the first block may be superimposed on the second block.

As a further example, a major change may refer to a change between blocks where one of the blocks would not be compatible if superimposed over the other. For example, a major decrease may refer to a decrease in fields between a first block and a second block where fields of the second block could not be superimposed over fields of the first block without further transforming the respective blocks of data. Similarly, a major increase may refer to an increase in fields between a first block and a second block where fields of the first block could not be superimposed over fields of the second block without further transforming the respective blocks of data.

In one or more embodiments described herein, a minor and/or major decrease may occur between a first version of firmware and a second version of firmware where the second version of firmware is an older or less recent version of the firmware than the first version of firmware (e.g., a reverse update). Alternatively, in one or more embodiments described herein, a minor and/or major increase may occur between a first version of firmware and a second version of firmware where the second version of firmware is a newer or more current version of the firmware than the first version (e.g., a forward update). In one or more embodiments described herein, a lateral update may involve a combination of major and/or minor changes (or all major and/or minor matches) between respective versions. Moreover, any of the above types of upgrades (e.g., reverse, forward, lateral) may include a combination of major and minor decreases and/or increases.

As shown in FIG. 3B, based on the evaluation of associated migration arrays (e.g., based on comparing attributes of the arrays), the firmware update system 114 may perform an act 326 of determining whether a major revision and minor revision match between associated metadata blocks. Where the firmware update system 114 determines that the major and minor revisions match, the firmware update system 114 may perform an act 328 of copying an amount of data indicated by size field(s) (e.g., size fields from either the previous version migration structure or the next version migration structure) from the previous address (e.g., from the previous version migration structure) to a next address (e.g., from the next version migration structure). For example, the firmware update system 114 may copy a metadata block from the metadata structure associated with the first version of firmware to a next address of the updated metadata structure. The address of the metadata block within the updated metadata structure may correspond to an address attribute within the next migration array. Upon performing the migration action of act 328, the firmware update system 114 may return to act 320 and continue iterating through blocks of the metadata structure 108.

Figure 4A:
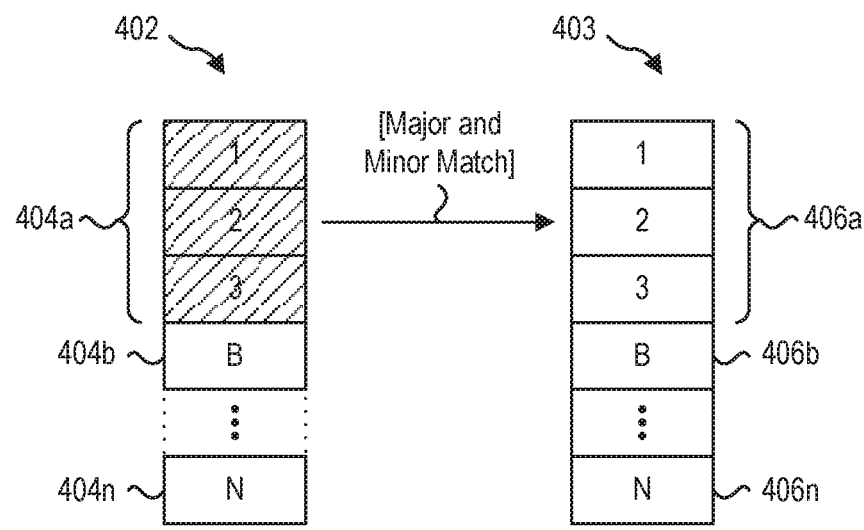
FIGS. 4A-4D illustrate example migration actions for respective metadata blocks based on a comparison of migration arrays in accordance with one or more embodiments.

To illustrate an example migration action in accordance with act 328. FIG. 4A illustrates an example comparison of data between a first version of the metadata structure 402 and a second version of the metadata structure 403. In particular, the firmware update system 114 may compare a previous version array corresponding to a first version metadata block 404*a* and a next version array corresponding to a second version metadata block 406*a* to determine that the major and minor revisions for the corresponding blocks 404*a*, 406*a* match. Based on this determination, the firmware update system 114 may perform a simple copy migration function by migrating the first version metadata block 404*a* (or the second version metadata block 406*a*) to an updated version of the metadata structure.

As shown in FIG. 4A, the firmware update system 114 may perform a similar evaluation of migration arrays for first version metadata blocks 404*b-n* and second version metadata blocks 404*b-n*. Each of the metadata blocks 404*b-n* and 406*b-n* may include any number of corresponding fields and definitions in accordance with one or more embodiments described herein.

Returning to FIG. 3B, where the firmware update system 114 does not determine that major and minor revisions match, the firmware update system 114 may perform an act 330 of determining whether major revisions match and minor revisions decrease between respective firmware versions. Where the firmware update system 114 identifies a decrease in minor revisions, the firmware update system 114 may perform an act 332 of copying an amount of data indicated by a next size field (e.g., from the next version migration structure) from a previous address to a next address. Upon performing the migration action of act 332, the firmware update system 114 may return to act 320 and continue iterating through blocks of the metadata structure 108.

Figure 4B:
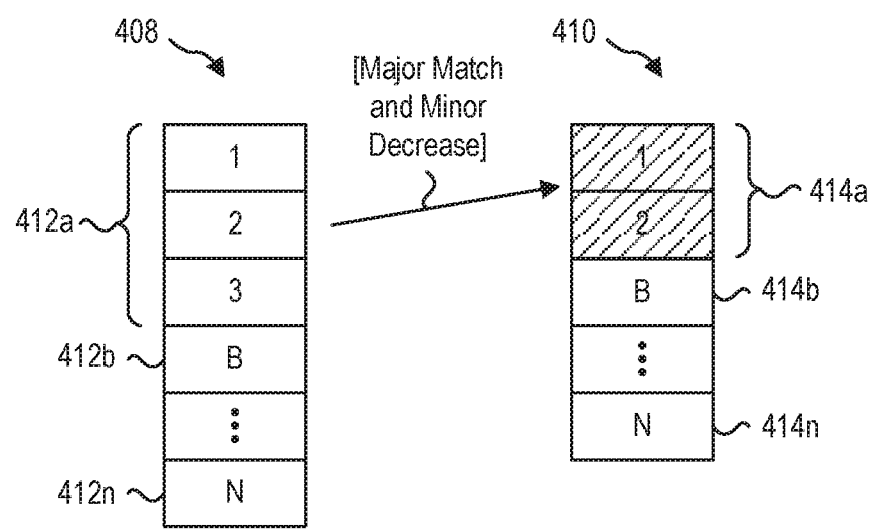

FIG. 4B illustrates an example migration action in accordance with act 332. In particular, FIG. 4B illustrates an example comparison of data between a first version of the metadata structure 408 and a second version of the metadata structure 410 in which a minor decrease occurs between a first version metadata block 412a and a second version metadata block 414a. For example, the firmware update system 114 may compare attributes of corresponding migration arrays to determine that a minor revision decrease (and a major revision match) applies. Based on this determination, the firmware update system 114 may perform a copy migration function by migrating the second version metadata block 414a to an updated version of the metadata structure. The firmware update system 114 may similarly compare migration arrays between additional previous blocks 412b-n and additional next blocks 414b-n.

In addition, because of an offset that may occur within the updated metadata structure as a result of the minor decrease, the firmware update system 114 may update an adder component or other tracking mechanism to ensure that the address and size of the resulting updated metadata structure are correct. For example, the firmware update system 114 may update an address and size field of a migration array for the updated metadata structure to reflect the change in size and address of the migrated metadata block relative to the previous version of the metadata structure.

Returning to FIG. 3B, where the firmware update system 114 does not determine a major match and a minor decrease, the firmware update system 114 may perform an act 334 of determining whether the major and/or minor revisions increase between respective firmware versions. Where the firmware update system 114 identifies an increase in the major or minor revisions, the firmware update system 114 may perform an act 336 of identifying and performing a corresponding migration action from a function array. Upon performing the migration action, of act 336, the firmware update system 114 may return to act 320 and continue iterating through blocks of the metadata structure 108.

Figure 4C:
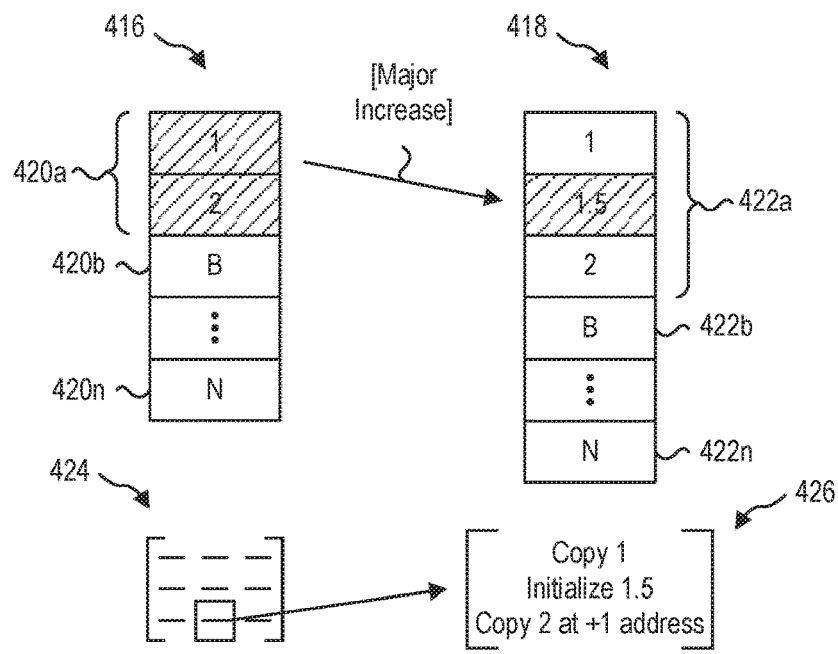

FIG. 4C illustrates an example migration action in accordance with act 336. In particular, FIG. 4C illustrates an example comparison of data between a first version of the metadata structure 416 and a second version of the metadata structure 418 in which a major increase occurs between a first version metadata block 420a and a second version metadata block 420b. For example, the firmware update system 114 may compare attributes of corresponding migration arrays to determine that a major revision increase (or a minor revision increase) applies. Based on this determination, the firmware update system 114 may identify a function array 424 including a number of migration functions corresponding to different types of updates.

For example, as shown in FIG. 4C, the function array 424 may include a matrix having a plurality of fields corresponding to migration actions that the firmware update system 114 should perform based on a type of major and/or minor change. The function array 424 may include a corresponding action for each permutation of change between the first version metadata block 420a and the second version of the metadata block 420b. In this example, the firmware update system 114 identifies an entry from within the function array 424 including a set of instructions 426 for migrating data from one or a combination of the metadata structures 416, 418 in generating an updated metadata block that is compatible with the firmware update.

As an illustrative example shown in FIG. 4C, the set of instructions 426 from the function array 424 includes a first instruction to copy "1" (e.g., from the first metadata structure 416). The set of instructions 426 further includes a second instruction to initiate "1.5." The set of instructions 426 further includes a third instruction to copy "2" at a modified address (e.g., address+1) based on the 1.5 being initiated between the "1" field and the "2" field from the first version metadata block 420a. The firmware update system 114 may similarly compare mitigation arrays and perform various migration action for additional previous blocks 420b-n and additional next blocks 422b-n in accordance with one or more embodiments described herein.

Returning to FIG. 3B, where the firmware update system 114 does not identify a major or minor increase between metadata blocks, the firmware update system 114 may perform an act 338 of determining whether a hard reset is required (e.g., where the previous and next metadata blocks are determined to be incompatible). Where a hard reset is required, the firmware update system 114 may perform an act 340 of performing a hard reset for the corresponding metadata block. The firmware update system 114 may further reinitiate the metadata block for the updated metadata structure. Upon performing the hard reset and/or reinitialization of data for the metadata block, the firmware update system 114 may return to act 320 and continue iterating through blocks of the metadata structure 108.

Figure 4D:
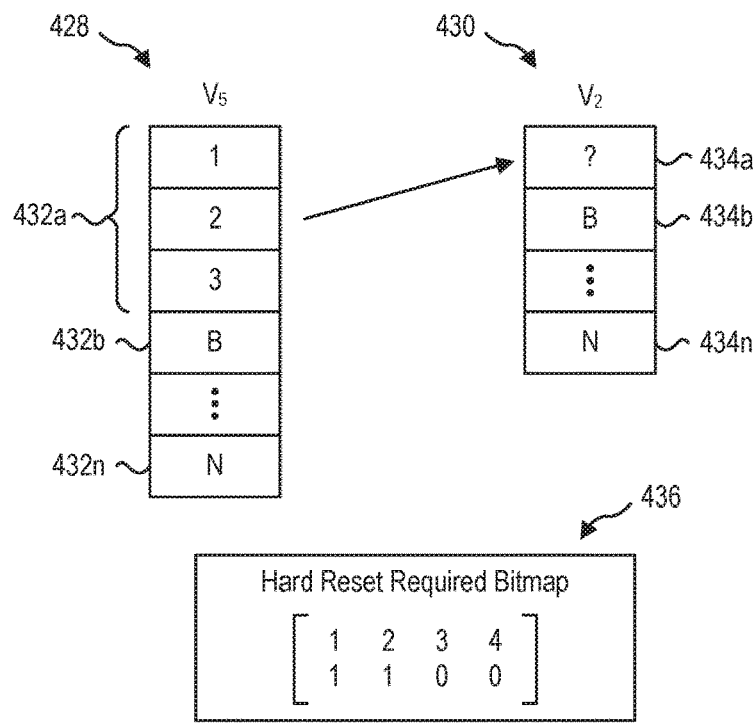

To illustrate, FIG. 4D shows an example migration action in accordance with act 340. In particular, FIG. 4D illustrates an example comparison of data between a first version of the metadata structure 428 and a second version of the metadata structure 430 in which the firmware update system 114 has determined that a major decrease applies and/or where it is unknown what type of change is happening between the first version metadata block 432a and the second version metadata block 434a. In this example, the firmware update system 114 identifies a hard reset required bitmap 436 including a set of values indicating whether metadata for the first version of firmware is compatible with the second version of firmware.

For example, in FIG. 4D, the previous version of the metadata structure 428 refers to a fifth version ($V_5$) of the firmware while the next version of the metadata structure 430 refers to a second version ($V_2$) of the firmware (e.g., an older or less recent version of the firmware). Based on this determination, the firmware update system 114 may evaluate the hard reset required bitmap 436 to determine that while the fifth version of the firmware is backwards compatible with either version 3 or version 4 (e.g., versions 3 and 4 correspond to "0" bit values), the fifth version of the firmware is nonetheless not backwards compatible with either version 1 or version 2 (e.g., versions 1 and 2 correspond to "1" bit values).

Based on this determination, the firmware update system 114 may perform a hard reset for a metadata block of the updated metadata structure and reinitialize the metadata block based on the metadata from the next version of the metadata structure 430 rather than migrating any of the data from the previous version of the metadata structure 428. More specifically, the firmware update system 114 may selectively perform a hard reset for the metadata block corresponding to the first version metadata block 432*a* rather than migrating any of the data from the first version metadata block 432*a*. The firmware update system 114 may similarly evaluate migration arrays for the additional first version metadata blocks 432*b-n* and the additional second version metadata blocks 434*b-n* in accordance with one or more embodiments described herein.

Returning to FIG. 3B, where the firmware update system 114 does not determine that a hard reset is required, the firmware update system 114 may perform an act 342 of determining whether a namespace format is required. This may involve a similar process as discussed above in connection with evaluating a hard reset required bitmap. In particular, the firmware update system 114 may evaluate a namespace format required bitmap having similar characteristics as the hard reset required bitmap 436 to determine whether updating from a previous version to a specific next version involves a change in metadata structure between a previous firmware version and a next firmware version. (e.g., where data for the next firmware version is known to have a different format or layout within physical media of the computing device 102).

Where the firmware update system 114 determines that a namespace format is required, the firmware update system 114 may perform an act 344 of making the namespace inaccessible and populating metadata for reformat within the updated metadata structure. In this way, the firmware update system 114 may ensure that where user data referenced by the metadata block has a different format between different firmware versions, the resulting updated metadata block will be compatible with the updated firmware. Upon performing act 344, the firmware update system 114 may return to act 320 and continue iterating through blocks of the metadata structure 108.

Alternatively, where the major revision decreases and where neither the hard reset is required or the namespace format is required, the firmware update system 114 may perform an act 346 of reinitializing the structure for the metadata block within the updated metadata structure (e.g., without performing a hard reset of namespace reformate). As further shown in FIG. 3B, upon performing act 346, the firmware update system 114 may return to act 320 and continue iterating through blocks of the metadata structure 108 until each of the blocks have been evaluated and the updated metadata structure is complete.

Figure 5:
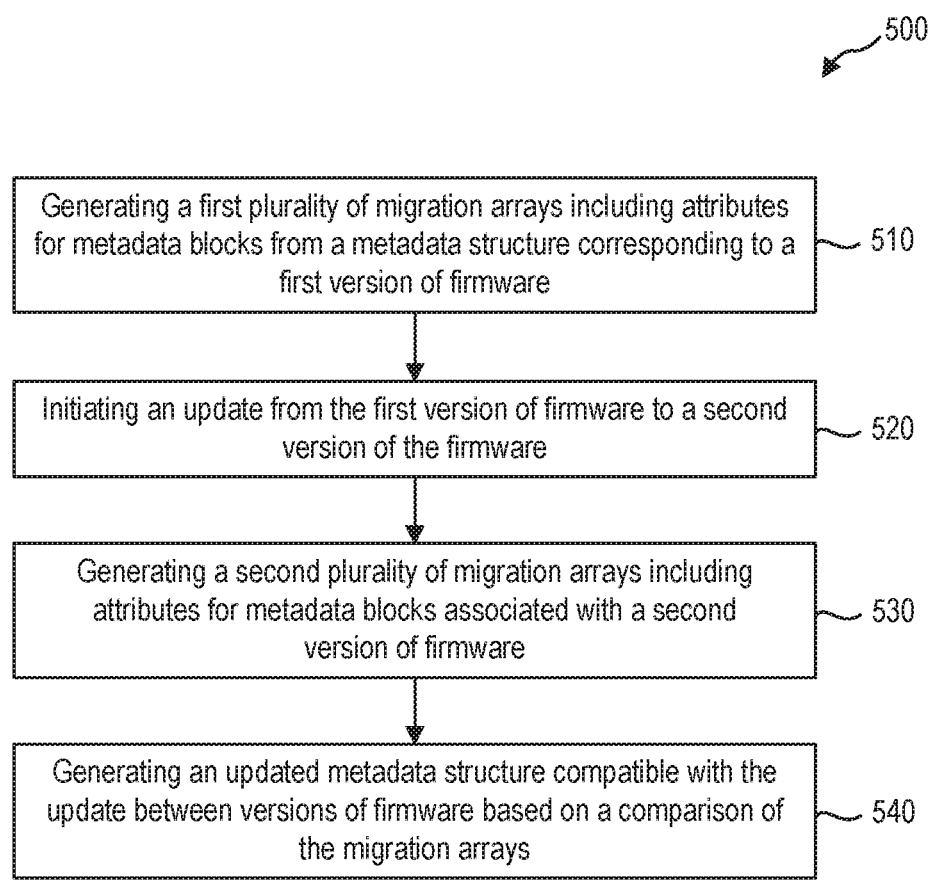
FIG. 5 illustrates a series of acts for implementing an upgrade between versions of firmware in accordance with one or more embodiments.

Turning now to FIG. 5, this figure illustrates an example flowchart including a series of acts for generating and comparing migration structures and generating an updated metadata structure that is compatible for an upgrade between a previous version of firmware and a next version of firmware. While FIG. 5 illustrates acts according to one or more embodiments, alternative embodiments may omit, add to, reorder, and/or modify any of the acts shown in FIG. 5. Moreover, one or more of the individual features and functionalities described in connection with individual acts or series of acts in connection with FIG. 5 may similarly apply to other embodiments and examples described herein. The acts of FIG. 5 can be performed as part of a method. Alternatively, a non-transitory computer-readable medium can include instructions that, when executed by one or more processors, cause a computing device to perform the acts of FIG. 5. In still further embodiments, a system can perform the acts of FIG. 5.

As shown in FIG. 5, a series of acts 500 may include an act 510 of generating a first plurality of migration arrays having attributes for metadata blocks from a metadata structure corresponding to a first version of hardware. For example, the act 510 may include generating a first plurality of migration arrays having a first set of attributes for a first plurality of metadata blocks from a metadata structure where the first plurality of metadata blocks includes metadata for corresponding functional elements of a first version of firmware.

In one or more embodiments, the first plurality of migration arrays includes identifiers for the first set of attributes. The identifiers may include two or more of a major revision for a corresponding metadata block from the first plurality of metadata blocks, a minor revision for the corresponding metadata block, a size of the corresponding metadata block, an address of the corresponding metadata block, and at least one bitmap indicating compatibility between the corresponding metadata block for the first version and one or more additional firmware versions.

As further shown, the series of acts 500 may include an act 520 of initiating an update from the first version of firmware to a second version of the firmware. For example, the act 520 may include initiating an update from a previous version of firmware to a next version of firmware.

The series of acts 500 may further include an act 530 of generating a second plurality of migration arrays having attributes for metadata blocks associated with a second version of firmware. For example, the act 530 may include generating a second plurality of migration arrays having a second set of attributes for a second plurality of metadata blocks corresponding to functional elements of a second version of firmware.

The series of acts 500 may additionally include an act 540 of generating an updated metadata structure compatible with the update between versions of firmware based on a comparison of the migration arrays. For example, the act 540 may include generating an updated metadata structure compatible with the update from the first version of firmware to the second version of firmware based on a comparison of the first plurality of migration arrays and the second plurality of migration arrays.

In one or more embodiments, generating the updated metadata structure includes, for each migration array from the first plurality of migration arrays, determining a type of change between a metadata block from the first plurality of metadata blocks and an associated metadata block from the second plurality of metadata blocks based on a comparison between the migration array from the first plurality of migration arrays and a migration array from the second plurality of migration arrays. Generating the updated metadata structure may further include performing a migration action to populate the updated metadata structure based on the determined type of change.

In one or more embodiments, the series of acts 500 includes performing a first migration action based on a first type of change or, alternatively, a second migration action based on a second type of change. For example, the series of acts 500 may include performing a first or second migration action based on whether a type of change is a minor change (e.g., a minor revision decrease or a minor revision increase) or whether a type of change is a major change (e.g., a major revision increase or a minor revision increase). The series of acts 500 may additionally include performing a corresponding migration action based on a determination that revisions match between previous and next associated migration arrays.

In one or more embodiments, determining the type of change includes determining that a major revision and a minor revision from the migration array matches a major revision and a minor revision from the associated migration array. In this example, performing the migration action may include copying the metadata block to a next address for the updated metadata structure.

In one or more embodiments, determining the type of change includes determining that a major revision from the migration array matches a major revision from the associated migration array and identifying a decrease from a minor revision from the migration array to a minor revision from the associated migration array. In this example, performing the migration action may include copying a metadata block from the second plurality of metadata blocks to a next address for the updated metadata structure.

In one or more embodiments, determining the type of change includes identifying an increase from a major revision or a minor revision from the migration array to a major revision or minor revision from the associated migration array. In this example, performing the migration action may include identifying a function array that defines a plurality of migration actions, identifying a migration action from the function array including a series of instructions based on whether the identified increase is a major increase or a minor increase, and executing the series of instructions from the identified migration action from the function array.

In one or more embodiments, determining the type of change includes identifying a decrease from a major revision from the migration array to a major revision from the associated migration array. In this example, performing the migration action may include identifying, from a compatibility bitmap including an index of compatibility between the first version of firmware and one or more additional versions of firmware, an indication that updating the metadata block is not compatible with the second version of firmware and further, based on the indication that updating the metadata block is not compatible with the second version of firmware, performing a hard reset and reinitiating a new metadata block for the updated metadata structure.

In one or more embodiments, determining the type of change includes identifying a decrease from a major revision from the migration array to a major revision from the associated migration array. In this example, performing the migration action may include identifying, from a compatibility bitmap including an index of formats between the first version of firmware and one or more additional versions of firmware, an indication that a namespace format is required when updating from the first version of firmware to the second version of firmware and, based on the indication that the namespace format is required, populate metadata within a new metadata block for the updated metadata structure in accordance with an updated namespace format for the second version of firmware.

In one or more embodiments, generating the updated metadata structure based on the comparison of the first plurality of migration arrays and the second plurality of migration arrays is performed based on determining that the second version of firmware is multiple versions more current than the first version of firmware. In one or more embodiments, generating the updated metadata structure based on the comparison of the first plurality of migration arrays and the second plurality of migration arrays is performed based on determining that the second version is a less current version of firmware than the first version of firmware.

The series of acts 500 may further include identifying pairs of migration arrays where each pair of migration arrays includes a first migration array from the first plurality of migration arrays and a second migration array from the second plurality of migration arrays. The series of acts 500 may also include iteratively comparing attributes from each pair of migration arrays. In one or more embodiments, generating the updated metadata structure is based on iteratively comparing attributes from each pair of migration arrays.

Figure 6:
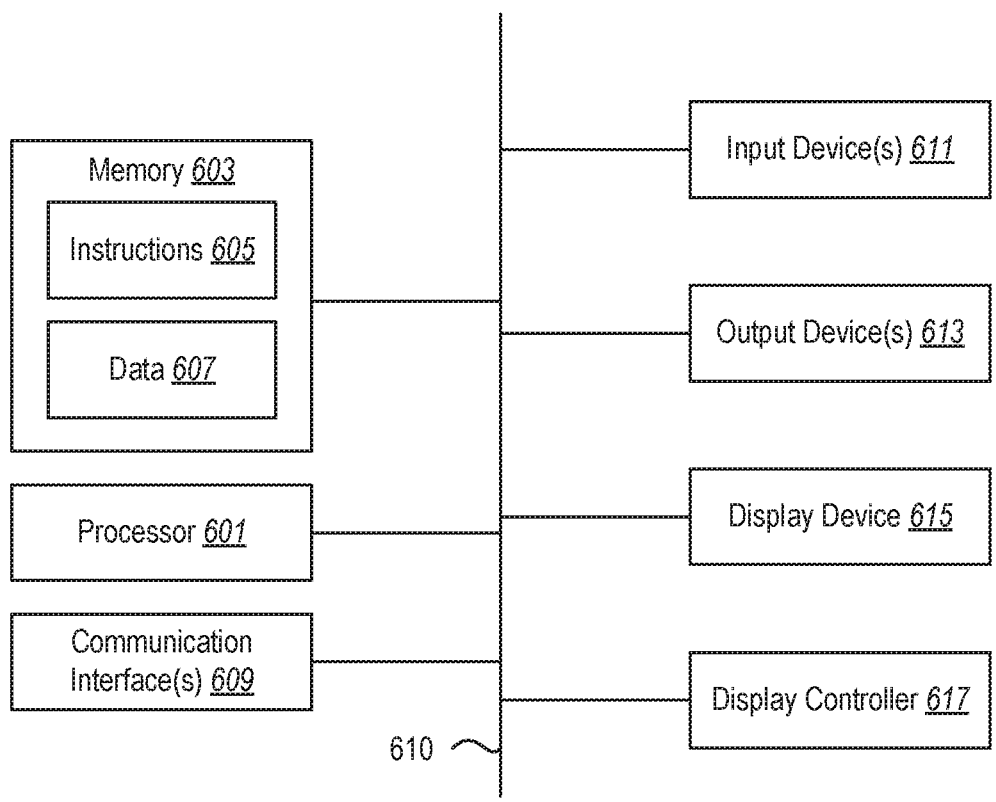
FIG. 6 illustrates certain components that may be included within a computer system.

FIG. 6 illustrates certain components that may be included within a computer system 600. One or more computer systems 600 may be used to implement the various devices, components, and systems described herein.

The computer system 600 includes a processor 601. The processor 601 may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 601 may be referred to as a central processing unit (CPU). Although just a single processor 601 is shown in the computer system 600 of FIG. 6, in an alternative configuration, a combination of processors (e.g., an ARM and DSP) could be used.

The computer system 600 also includes memory 603 in electronic communication with the processor 601. The memory 603 may be any electronic component capable of storing electronic information. For example, the memory 603 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 605 and data 607 may be stored in the memory 603. The instructions 605 may be executable by the processor 601 to implement some or all of the functionality disclosed herein. Executing the instructions 605 may involve the use of the data 607 that is stored in the memory 603. Any of the various examples of modules and components described herein may be implemented, partially or wholly, as instructions 605 stored in memory 603 and executed by the processor 601. Any of the various examples of data described herein may be among the data 607 that is stored in memory 603 and used during execution of the instructions 605 by the processor 601.

A computer system 600 may also include one or more communication interfaces 609 for communicating with other electronic devices. The communication interface(s) 609 may be based on wired communication technology, wireless communication technology, or both. Some examples of communication interfaces 609 include a Universal Serial Bus (USB), an Ethernet adapter, a wireless adapter that operates in accordance with an Institute of Electrical and Electronics Engineers (IEEE) 802.11 wireless communication protocol, a Bluetooth wireless communication adapter, and an infrared (IR) communication port.

A computer system 600 may also include one or more input devices 611 and one or more output devices 613. Some examples of input devices 611 include a keyboard, mouse, microphone, remote control device, button, joystick, trackball, touchpad, and light pen (or light-sensitive wand). Some examples of output devices 613 include a speaker and a printer. One specific type of output device that is typically included in a computer system 600 is a display device 615. Display devices 615 used with embodiments disclosed herein may utilize any suitable image projection technology, such as liquid crystal display (LCD), light-emitting diode (LED), gas plasma, electroluminescence, or the like. A display controller 617 may also be provided, for converting data 607 stored in the memory 603 into text, graphics, and/or moving images (as appropriate) shown on the display device 615.

The various components of the computer system 600 may be coupled together by one or more buses, which may include a power bus, a control signal bus, a status signal bus, a data bus, etc. For the sake of clarity, the various buses are illustrated in FIG. 6 as a bus system 619.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
generating a first plurality of migration arrays including a first set of attributes for a first plurality of metadata blocks from a metadata structure, the first plurality of metadata blocks including metadata for corresponding functional elements of a first version of firmware;
initiating an update from the first version of the firmware to a second version of the firmware;
generating a second plurality of migration arrays including a second set of attributes for a second plurality of metadata blocks corresponding to functional elements of a second version of firmware; and
generating an updated metadata structure compatible with the update from the first version of firmware to the second version of firmware based on a comparison of the first plurality of migration arrays and the second plurality of migration arrays.

2. The method of claim 1, further comprising:
identifying pairs of migration arrays, wherein each pair of migration arrays includes a first migration array from the first plurality of migration arrays and a second migration array from the second plurality of migration arrays; and
iteratively comparing attributes from each pair of migration arrays,
wherein generating the updated metadata structure is based on iteratively comparing attributes from each pair of migration arrays.

3. The method of claim 1, wherein the first plurality of migration arrays include identifiers for the first set of attributes, the identifiers including two or more of a major revision for a corresponding metadata block from the first plurality of metadata blocks, a minor revision for the corresponding metadata block, a size of the corresponding metadata block, an address of the corresponding metadata block, and at least one bitmap indicating compatibility between the corresponding metadata block for the first version and one or more additional firmware versions.

4. The method of claim 1, wherein generating the updated metadata structure comprises, for each migration array from the first plurality of migration arrays:
determining a type of change between a metadata block from the first plurality of metadata blocks and an associated metadata block from the second plurality of metadata blocks based on a comparison between the migration array from the first plurality of migration arrays and an associated migration array from the second plurality of migration arrays; and
performing a migration action to populate the updated metadata structure based on the determined type of change.

5. The method of claim 4,
wherein determining the type of change comprises determining that a major revision and a minor revision from the migration array matches a major revision and a minor revision from the associated migration array; and
wherein performing the migration action for the metadata block comprises copying the metadata block to a next address for the updated metadata structure.

6. The method of claim 4,
wherein determining the type of change comprises:
determining that a major revision from the migration array matches a major revision from the associated migration array; and
identifying a decrease from a minor revision from the migration array to a minor revision from the associated migration array, and
wherein performing the migration action for the metadata block comprises copying an associated metadata block from the second plurality of metadata blocks to a next address for the updated metadata structure.

7. The method of claim 4,
wherein determining the type of change comprises identifying an increase from a major revision or a minor revision from the migration array to a major revision or minor revision from the associated migration array, and
wherein performing the migration action comprises:
identifying a function array that defines a plurality of migration actions;
identifying a migration action from the function array including a series of instructions based on whether the identified increase is a major increase or a minor increase; and
executing the series of instructions from the identified migration action from the function array.

8. The method of claim 4,
wherein determining the type of change comprises identifying a decrease from a major revision from the migration array to a major revision from the associated migration array, and
wherein performing the migration action comprises:
identifying, from a compatibility bitmap including an index of compatibility between the first version of firmware and one or more additional versions of firmware, an indication that updating the metadata block is not compatible with the second version of firmware; and
based on the indication that updating the metadata block is not compatible with the second version of firmware, performing a hard reset and reinitiating a new metadata block for the updated metadata structure.

9. The method of claim 4,
wherein determining the type of change comprises identifying a decrease from a major revision from the migration array to a major revision from the associated migration array, and
wherein performing the migration action comprises:
identifying, from a compatibility bitmap including an index of formats between the first version of firmware and one or more additional versions of firmware, an indication that a namespace format is required when updating from the first version of firmware to the second version of firmware; and
based on the indication that the namespace format is required, populate metadata within a new metadata block for the updated metadata structure in accordance with an updated namespace format for the second version of firmware.

10. The method of claim 1, wherein generating the updated metadata structure based on the comparison of the first plurality of migration arrays and the second plurality of migration arrays is performed based on determining that the second version of firmware is multiple versions more current than the first version of firmware.

11. The method of claim 1, wherein generating the updated metadata structure based on the comparison of the first plurality of migration arrays and the second plurality of migration arrays is performed based on determining that the second version is a less current version of firmware than the first version of firmware.

12. A system, comprising:
one or more processors;
memory in electronic communication with the one or more processor; and
instructions stored in the memory, the instructions being executable by the one or more processors to:
generate a first plurality of migration arrays including a first set of attributes for a first plurality of metadata blocks from a metadata structure, the first plurality of metadata blocks including metadata for corresponding functional elements of a first version of firmware;
initiate an update from the first version of the firmware to a second version of the firmware;
generate a second plurality of migration arrays including a second set of attributes for a second plurality of metadata blocks corresponding to functional elements of a second version of firmware; and
generate an updated metadata structure compatible with the update from the first version of firmware to the second version of firmware based on a comparison of the first plurality of migration arrays and the second plurality of migration arrays.

13. The system of claim 12, further comprising instructions executable by the one or more processors to:
identify pairs of migration arrays, wherein each pair of migration arrays includes a first migration array from the first plurality of migration arrays and a second migration array from the second plurality of migration arrays; and
iteratively compare attributes from each pair of migration arrays,
wherein generating the updated metadata structure is based on iteratively comparing attributes from each pair of migration arrays.

14. The system of claim 12, wherein the first plurality of migration arrays include identifiers for the first set of attributes, the identifiers including two or more of a major revision for a corresponding metadata block from the first plurality of metadata blocks, a minor revision for the corresponding metadata block, a size of the corresponding metadata block, an address of the corresponding metadata block, and at least one bitmap indicating compatibility between the corresponding metadata block for the first version and one or more additional firmware versions.

15. The system of claim 12, wherein generating the updated metadata structure comprises, for each migration array from the first plurality of migration arrays:
determining a type of change between a metadata block from the first plurality of metadata blocks and an associated metadata block from the second plurality of metadata blocks based on a comparison between the migration array from the first plurality of migration arrays and an associated migration array from the second plurality of migration arrays; and
performing a migration action to populate the updated metadata structure based on the determined type of change.

16. The system of claim 15,
wherein determining the type of change between the metadata block and the associated metadata block includes determining whether a major increase occurs between a major revision from the migration array and a major revision from the associated migration array, and
wherein performing the migration action to populate the updated metadata structure includes:
performing a first migration action when the major increase occurs between the major revision from the migration array and the major revision from the associated migration array; and
performing a second migration action when the major increase does not occur between the major revision from the migration array and the major revision from the associated migration array.

17. The system of claim 15,
wherein determining the type of change between the metadata block and the associated metadata block includes determining whether a minor increase occurs between a minor revision from the migration array and a minor revision from the associated migration array, and
wherein performing the migration action to populate the updated metadata structure includes:
performing a first migration action when the minor increase occurs between the minor revision from the migration array and the minor revision from the associated migration array; and
performing a second migration action when the minor increase does not occur between the minor revision from the migration array and the minor revision from the associated migration array.

18. The system of claim 15,
wherein determining the type of change between the metadata block and the associated metadata block includes determining whether a major revision and a minor revision from the migration array matches a major revision and a minor revision from the associated migration array, and
wherein performing the migration action to populate the updated metadata structure includes:
performing a first migration action when the major revision and the minor revision from the migration array matches the major revision and the minor revision from the associated migration array; and
performing a second migration action when the major revision and the minor revision from the migration array do not match the major revision and the minor revision from the associated migration array.

19. A non-transitory computer-readable medium storing instructions thereon that, when executed by one or more processors, causes a computing device to:
generate a first plurality of migration arrays including a first set of attributes for a first plurality of metadata blocks from a metadata structure, the first plurality of metadata blocks including metadata for corresponding functional elements of a first version of firmware;
initiate an update from the first version of the firmware to a second version of the firmware;
generate a second plurality of migration arrays including a second set of attributes for a second plurality of metadata blocks corresponding to functional elements of a second version of firmware; and
generate an updated metadata structure compatible with the update from the first version of firmware to the second version of firmware based on a comparison of the first plurality of migration arrays and the second plurality of migration arrays.

20. The non-transitory computer-readable medium of claim 19, further comprising instructions that, when executed by the one or more processors, causes the computing device to:
identify pairs of migration arrays, wherein each pair of migration arrays includes a first migration array from the first plurality of migration arrays and a second migration array from the second plurality of migration arrays; and
iteratively compare attributes from each pair of migration arrays,
wherein generating the updated metadata structure is based on iteratively comparing attributes from each pair of migration arrays.

\* \* \* \* \*